C. G. MYERS AND O. C. BILLMAN.
LIGHT CONCENTRATOR AND PROJECTOR.
APPLICATION FILED SEPT. 29, 1917.

1,433,292.

Patented Oct. 24, 1922.

Patented Oct. 24, 1922.

1,433,292

UNITED STATES PATENT OFFICE.

CHARLES G. MYERS AND OBED C. BILLMAN, OF CLEVELAND, OHIO.

LIGHT CONCENTRATOR AND PROJECTOR.

Application filed September 29, 1917. Serial No. 193,868.

*To all whom it may concern:*

Be it known that we, CHARLES G. MYERS and OBED C. BILLMAN, citizens of the United States, residing at Cleveland, in the county of Cuyahoga and State of Ohio, have invented certain new and useful Improvements in Light Concentrators and Projectors, of which the following is a specification.

This invention relates to improvements in light concentrators and projectors, and more particularly to that class or type known as automobile head lamps, search lights, spot lamps, and the like, the primary object of the invention being to intercept and refract certain rays of light, as received from the source of illumination and the condensing element or reflector thereby removing from the ordinary projected field of light from such condensing element or reflector certain rays of light which would otherwise reach the eyes of a person in such projected field and produce what is known as a "glare", as for example,—the chauffeur or occupant of an oncoming automobile, or a pedestrian, as the case may be.

This invention relates also to certain improvements in light concentrators and projectors of the class or type disclosed and claimed in Patent No. 1,077,153, issued October 28, 1913, to Charles G. Myers, on an application filed November 15, 1911, and reissued March 7, 1916, No. 14,083. As in said patent there is combined with a suitable source of illumination and condensing element, a light intercepting element cutting out the projected and direct rays of light from a portion of the ordinary projected field of the condensing element, said light intercepting element, in the present instance, comprising light refracting elements adapted to control and project the rays of light and provide a field of illumination particularly adapted to meet the varying requirements of automobile head lamps of the class mentioned.

The present invention is particularly adapted not only for arresting the objectionable unreflected or direct rays of light which ordinarily emanate from the source of light and diverge upwardly and outwardly in front of the head light resulting in a large area of what is known as a "curtain of light" which is not only blinding to a person approaching the light, but interferes also with the view of the surfaces in front of the head light by a person stationed behind the head light such as the chauffeur or occupant of the car being driven, but is also specially designed and adapted to utilize certain of such unreflected or direct rays of light and permit certain downwardly and outwardly directed rays of light to pass unobstructed upon the roadway, certain direct and reflected rays being deflected laterally to widen the beam near the head light and for some predetermined distance therefrom for a proper lateral distribution and illumination and not now attained in the ordinary head lights or no-glare device now in use, and particularly not in conjunction with a proper projection and distribution of the rays of light a substantial distance ahead and over a proper and fixed area without glare as required by present laws.

The "curtain of light" caused by the widely divergent upwardly and outwardly directed rays of light above referred to is particularly objectionable in thick or heavy weather because the rays of light illuminate a mist, snow particles in the air, a fog, or the like, and practically obscure the view in front of the head light, and the improved refractive lens herein described for arresting these direct rays not only eliminates the above stated difficulties, but, in so doing, offers practically no obstruction to the substantially parallel refracted rays of the head light so that the efficiency of the latter is practically unimpaired.

The present invention therefore contemplates a device which will in a simple and inexpensive form fulfill all these imposed conditions, as to glare without materially sacrificing the illuminative efficiency of the head light, so that not only the road itself, but the space at each side of the car as well will be fully illuminated in order to avoid accidents caused by the sudden stepping of pedestrians from the curb or the protruding of obstructions from the side.

It will be understood that the disclosure is based on the original and best focus of the lamp possible under the individual conditions, and that the light from such light source in such focus is sent forward in a slight diverging cone of light with its axis directly level or parallel with the road surface, and that the illuminated area available for seeing the roadway comprises that portion of such surface which intersects such cone of lights.

It is a purpose of this invention to effect a redistribution of light emerging from the head light so that its projection on the roadway shall be as nearly uniform in distribution as conditions will permit. To this end there is, therefore, provided means to intercept and refract the direct or unrefracted rays of light issuing from the source of illumination at the axial plane of the reflector and the source of illumination, and to refract and project such rays of light in a substantially concentrated beam along and at one side of the common axial plane of such reflector and light source, such intercepting and refracting means preferably comprising a central supplemental or refracting lens on the main refracting lens or cover, and as a means of depressing and properly distributing the reflected rays of light from the upper portion of the reflector or condensing element, the main lens or cover is provided at its top with semi-circular shaped tapering prisms, said prisms being preferably concentrically arranged on the inner upper side of the lens cover with their base portions downwardly, and preferably arranged in the form of median and side sectors, said median sector of concentric prisms being adapted to depress the rays of light downwardly toward and below the axial plane of the ordinary field of light projected from the reflector, the prisms of said side sectors being also adapted to refract the rays of light laterally to widen the beam upon the roadway at the sides of the latter and relatively near the head lights and vehicle, by being gradually decreased in depth and refractive power from the terminating portions of the prisms of the median sector to the axial plane of the lens cover and the condensing or reflecting element, such prisms of said side sectors forming in effect "distributing prisms" and constituting the lateral deflecting elements for side illumination, the illumination of the field of light relatively near the vehicle to which the lights are attached being further increased by the provision of a plain or non-refracting semi-circular shaped portion or sector of the lamp front or cover permitting the directly reflected rays from the lower portion of the reflector and the direct or unreflected rays of light from the source of illumination to pass therethrough perfectly unobstructed and unimpaired, it being found that such downwardly and outwardly directed rays of light cannot reach such a position in the light field as to produce "glare" and that the same may serve to more properly illuminate the roadway.

With the above mentioned and other ends in view, the invention consists in the novel construction, arrangement, and combination of parts, hereinafter described, illustrated in some of its embodiments in the accompanying drawings, and particularly pointed out in the appended claims.

Referring to the drawings, forming a part of this specification, Figure 1, is a central longitudinal vertical sectional view of an ordinary parabolic reflector or condensing element of an ordinary head light equipped with a lens or refracting cover constructed in accordance with this invention and illustrating the control and refraction of the reflected and direct rays of light therein when the source of illumination is at its proper focal point.

Fig. 2, an enlarged view of the inner or rear side of the improved lens or refracting cover removed.

Fig. 3, an isometric view of the same illustrating in particular the arrangement and form of the lens and prismatic refracting elements formed on the rear or inner side thereof.

Fig. 4, a diagrammatic view illustrating the refraction and projection of the rays of light and the form of the beam in the projected field and the manner in which certain rays are intercepted or cut off from the eye in such projected field.

Fig. 5, a view of a modified form of lens cover in which an inwardly projecting light intercepting and reflecting element is provided adapted to intercept and reproject certain direct rays of light from the source of illumination through the central portion of the lens cover and downwardly to better illuminate the roadway relatively near the lamp.

Similar numerals of reference designate like parts throughout all the figures of the drawings.

The improved lens or refracting cover 1, being intended for use in connection with any ordinary condensing element or reflector 2, of any ordinary head lamp should be made to correspond in diameter and in form and in thickness at its marginal edges 1ª, to that of the ordinary plain glass or cover front of the ordinary head lamp which it is designed to replace for the purposes hereinafter referred to. The improved lens or refracting cover 1, is preferably provided with a plain or non-refracting portion or sector 1ᵇ, and as a means of intercepting and refracting the reflected rays 3ª, in the upper portion of the reflector forwardly and downwardly, whereby such refracted rays 3ª, are projected toward and below a horizontal plane containing the axis of the condensing element and light source indicated by the line C in Figs. 1, 4, and 5, of the drawings, as well as cutting out all direct or "glaring"

rays of light 3, from this portion of the reflector and the corresponding or upper portion of the ordinary field of light as projected by the ordinary reflector or condensing element, the inner upper half or portion of the lens or refracting cover 1, is provided with a series of semi-circular shaped concentrically arranged refracting prisms $1^c$, said refracting prisms $1^c$, being preferably arranged in the form of median and side sectors A, and B, respectively which, for convenience, are indicated by the lines A—A and B—B, in Figs. 2, and 3, of the drawings, the median or top sector A, corresponding to the upper quarter of the refracting lens and being of substantially uniform depth and refractive power throughout to refract and project the reflected rays $3^a$, and direct rays 3, in the upper portion of the reflector substantially as indicated in Figs. 1, and 4, of the drawings, and as a means of adapting the prisms $1^c$, of the side sectors B, to refract the rays of light laterally to a greater extent and to depress the same to a less extent than the refracting prisms in the median sector A, whereby to refract the rays of light laterally to widen the beam upon the roadway at the sides of the latter and relatively near the head lights, and also whereby to convert said prisms of said side sectors B, into what is termed "distributing prisms" the prisms in the side sectors B, are gradually decreased in depth and refractive power from the terminating portion of the prisms in the median sector indicated by the lines A—A to the lines B—B, the latter indicating the upper edge of the plain or non-refracting portion $1^b$, of the refracting cover 1, as shown most clearly in Fig. 3, of the drawings, it being obvious that such distributing prisms included in the side sectors B, constitute the lateral deflecting elements for side illumination so much required in meeting the varying demands of actual service in this class of lamps.

As a means of intercepting and refracting all the central direct rays of light 3, issuing from the source of illumination 4, and cutting out the glare of such rays, together with the directly reflected rays of light $3^b$, and which ordinarily pass in planes substantially parallel with the common axial plane of the reflector and condensing element and which are understood to be those primarily responsible for glare, the central portion of the lens or refracting cover 1, is provided with a central refracting lens $1^d$, which, in the form shown in Figs. 1, to 4, inclusive of the drawings, is of such refractive power and location relative to the source of illumination as to cause the refracted rays "c" issuing therefrom to cross each other, and after so crossing form a slightly diverging beam of light having its axial plane substantially coincident with that of the axial plane of the reflector and source of illumination as shown most clearly in Fig. 4, of the drawings.

As a means of intercepting the direct rays 3, and directly reflected rays $3^b$, of the light and preventing such rays coming from the central portion of the reflector and striking the lower portion of the lens $1^d$, (and which would otherwise be refracted into the upper portion of the projected field of light) the lower portion of the lens $1^d$, (in the present instance, the inner member thereof) is preferably provided with a segmental mutilated or cut out portion $1^e$, as shown most clearly in Figs. 1, and 3, of the drawings, and which segmental or cut out portion $1^e$, may also be utilized in permitting certain of the direct rays of light to pass forwardly and slightly downwardly as indicated by the line $3^c$, in Fig. 1, of the drawings, and where a lens of the character indicated in Fig. 5, is utilized, such a notched or cut out portion $1^e$, may be formed to permit the direct rays 3, to pass forwardly and downwardly in a manner similar to the direct rays passing through the plain or non-refracting portion $1^b$, to be now described.

Upon reference to Figs. 1, 4, and 5, of the drawings, it will be seen that all of the direct rays 3, in the lower portion of the reflector 2, and issuing directly from the light source 4, (with the exception of such as pass through the lens $1^d$) pass unobstructed and unrefracted through the lower or non-refracting portion $1^b$, of the lens and directly downwardly and forwardly as indicated at $3^d$, to illuminate the roadway immediately in front of the vehicle, and the reflected rays $3^a$, in the said lower portion of the lamp are permitted to pass out through the plain or non-refracting portion of the lens in a substantially horizontal plane as at $3^e$.

In the form of lens cover 1, shown in Figs. 1, to 4, inclusive of the drawings, such direct rays 3, as strike the refracting prisms $1^c$, at a sharp angle are projected upwardly in a substantially vertical direction as indicated in Figs. 1, and 4, of the drawings, and other portions of such direct rays striking these refracting prisms are refracted and diffused in widely variant lines, and such direct rays being comparatively small in number and being widely diffused, their effect in the field of light is negligible in so far as the real purposes of this invention are concerned.

In Fig. 5, of the drawings there is shown a modified form of lens cover in which a light intercepting element 5, is provided, said element 5, in the present instance, being in the specific form of a curved or substantially semi-cylindrical shaped member concentrically arranged with respect to the common axis C, of the reflector 2, and light source 4, and extending rearwardly therefrom above the refracting lens 1ᵈ, and being adapted to intercept all such upwardly and outwardly directed direct rays 3, which would otherwise strike the refracting prisms 1ᶜ, and as a means of converting said intercepting element 5, into a reflecting member or element the latter is preferably covered or coated on its top with a covering or coating of quicksilver 5ᵃ, or other suitable mirror forming or reflecting material so that all direct rays 3, striking such intercepting and reflecting element 5, will be reflected and reprojected through the refracting lens 1ᵈ, to pass downwardly and outwardly in a manner similar to that indicated at 3ᵍ, to further illuminate the roadway immediately in front of the vehicle, it being obvious that in such construction all such upwardly extending direct rays as would otherwise strike the refracting prisms 1ᶜ, in the form shown in Figs. 1, to 4, inclusive of the drawings, are entirely intercepted and are utilized and reprojected in a well defined direction through the lens 1ᵈ, for the purposes above mentioned.

In the diagrammatic view shown in Fig. 4, of the drawings it is understood that the target or barrier 6, is approximately 42 inches in heighth above the roadway and is placed approximately 50 feet ahead of the lamps, and it will be seen that the top portion of the beam of light projected from the lens 1ᵈ, and approximately outlined by the rays "c" does not extend above the 42 inch line indicated by the top of the target 6, and it will also be observed that the refracted rays 3ᵃ, issued from the light refracting prisms extend below the rays "c" and it will also be understood that at no time do any of the substantially horizontally extending unrefracted and reflecting rays 3ᵉ, passing out of the non-refracting portion 1ᵇ, of the lens as shown in Figs. 1, and 5, of the drawings extend above the upper rays "c" or 42 inch line, so that a substantially top flattened horizontal beam of light is projected along and below a horizontal beam containing the axis of the condensing element and source of illumination.

From the foregoing description, taken in connection with the accompanying drawings, the operation and advantages of this invention will be readily understood.

Having thus described some of the embodiments of this invention what is claimed and desired to be secured by Letters Patent, is,—

1. In combination with a head lamp adapted to project a concentrated beam of light a lens having concentrically arranged curved and tapered prisms on the upper half of its inner side.

2. In combination with a head lamp adapted to project a concentrated beam of light, a lens having concentric median and side prisms on its inner upper half, said side prisms being graduated in refractive power toward said median prisms.

3. A light concentrator and projector, comprising a condensing element, a light source at the focal point of said condensing element, and a refractor having above a horizontal plane passing through its axis curved median and tapered side prisms on its inner side for downwardly and laterally refracting, respectively, the light reflected from that portion of the condensing element which would otherwise reach the upper portion of the projected field.

4. In a lamp, including a source of illumination, and objective and projecting elements on opposite sides thereof, a light intercepting and refracting element and a light reflecting opaque fin element carried by said objective element, said refracting and reflecting elements refracting and reflecting the reflected and direct rays of light, respectively, on one side of the axial plane of said objective and projecting elements and projecting a beam of light on the opposite side of said axial plane.

5. A light concentrator and projector, comprising a condensing element adapted to project a concentrated beam of light, a light source at the axis and focus of said condensing element, and a refracting lens having a central lens and concentric reflecting fin and prismatic refracting elements disposed on one side of the longitudinal plane containing the axis of said condensing element and light source whereby the direct and reflected light rays are projected substantially parallel with and below a horizontal plane containing the axis of said condensing element and light source.

6. In a light concentrator and projector, including a source of illumination, and a condensing element, a light refracting lens and semi-circular tapered prismatic elements positioned in front of said source of illumination and the upper half of said condensing element, respectively, and refracting the direct and reflected rays of light as received from said source of illumination and condensing element, respectively, above a horizontal plane containing the axis of the latter whereby said direct and refracted rays of light are projected in a top flattened beam of light along and below a horizontal plane containing the axis of said condensing element and source of illumination.

7. A light concentrator and projector, comprising a condensing element adapted to project a concentrated beam of light, an axially located light source at the focus of said condensing element, and a refracting lens having concentric lens and prismatic refracting elements disposed on one side thereof, said prismatic refracting elements being arranged on the upper inner half of the refracting lens and tapered from the longitudinal plane containing the axis of said condensing element and light source whereby the light rays are projected in a laterally elongated beam below a horizontal plane containing the axis of said condensing element and light source.

8. In a light concentrator and projector, a condensing element, a lens cover having light refracting and light reflecting means covering that portion of the front of said condensing element lying on the upper side of a horizontal plane containing the axis of said reflector, and a light source at the focus of said condensing element, the remaining lower portion of the front of the condensing element being unobstructed by refracting means, said light refracting and reflecting means refracting and reflecting the reflected and direct rays received from said reflector and light source above said plane and directing the same downwardly and laterally whereby a concentrated beam of light is projected along and below said plane from the unobstructed portion of the condensing element and the reflected and direct rays of light from the other or upper portion thereof are deflected downwardly upon and laterally of said beam of light by the refracting and reflecting means.

9. In a light concentrator and projector, a condensing element, light refracting and laterally deflecting and downwardly reflecting means covering that portion of the front of said condensing element lying on the upper side of a horizontal plane containing the axis of said reflector, and a light source within the axis and focus of said condensing element, the remaining or lower portion of the front of the condensing element being unobstructed by refracting means whereby a concentrated beam of light is projected along and below said plane from the unobstructed portion of the condensing element, and light from said first mentioned portion thereof is deflected and reflected downwardly and laterally by said refracting reflecting and deflecting means.

In testimony whereof we have affixed our signatures in presence of two witnesses.

CHARLES G. MYERS.
OBED C. BILLMAN.

Witnesses:
R. H. HUNTER,
G. E. SCHWARM.